United States Patent
Tabb

(10) Patent No.: US 11,341,147 B1
(45) Date of Patent: May 24, 2022

(54) FINDING DIMENSIONAL CORRELATION USING HYPERLOGLOG

(71) Applicant: Google LLC, Mountain View, CA (US)

(72) Inventor: Lloyd Tabb, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/118,927

(22) Filed: Dec. 11, 2020

(51) Int. Cl.
*G06F 16/00* (2019.01)
*G06F 16/2458* (2019.01)
*G06F 16/28* (2019.01)
*G06F 16/22* (2019.01)

(52) U.S. Cl.
CPC ...... *G06F 16/2462* (2019.01); *G06F 16/2228* (2019.01); *G06F 16/285* (2019.01)

(58) Field of Classification Search
CPC .................................................. G06F 16/2462
USPC .......................................................... 707/737
See application file for complete search history.

(56) References Cited

U.S. PATENT DOCUMENTS

| 2015/0213358 A1* | 7/2015 | Shelton ............... H04L 41/0604 706/47 |
| 2017/0220612 A1* | 8/2017 | Crossley ............. G06F 16/3349 707/707 |
| 2019/0303479 A1* | 10/2019 | Behm ................. G06F 16/2471 707/707 |
| 2019/0384830 A1 | 12/2019 | Nazi et al. |
| 2020/0278977 A1* | 9/2020 | Halstead ............... G06F 16/285 707/707 |
| 2021/0357403 A1* | 11/2021 | Dash ................. G06F 16/24568 707/707 |

OTHER PUBLICATIONS

Vladimir Batygin ("Comparing three solutions for estimating population sizes," published on https://schibsted.com/blog/1732486-2/ on Nov. 29, 2017) (Year: 2017).*
Heule et al. HyperLogLog in Practice: Algorithmic Engineering of a State of The Art Cardinality Estimation Algorithm. Mar. 18, 2013. Extending Database Technology, ACM, 2 Penn Plaza, Suite 701 New York, NY, USA, pp. 683-692, DOI: 10.1145/2452376.2452456.

(Continued)

*Primary Examiner* — Alexandria Y Bromell
(74) *Attorney, Agent, or Firm* — Lerner, David, Littenberg, Krumholz & Mentlik, LLP

(57) ABSTRACT

A method for determining overlap between search terms in distinct elements in data collected from a number of sources. The method involves receiving a first search term, accessing a first hyperloglog sketch of the first search term and a second hyperloglog sketch of a second search term, and determining a degree of overlap between the first search term and the second search term based on the first hyperloglog sketch of the first search term and a second hyperloglog sketch of a second search term. Respective hyperloglog sketches of additional search terms can be accessed, and respective degrees of overlap between the first search term and the additional search terms can be determined. Respective correlation values can be assigned based on the respective degrees of overlap. Search results can be organized according to the respective correlation values in order to prioritize search terms having higher correlation values.

18 Claims, 8 Drawing Sheets

(56) References Cited

OTHER PUBLICATIONS

ERTL. New cardinality estimation algorithms for HyperLogLog sketches. Feb. 4, 2017. ARXIV.org, Cornell University Library, 201 Olin Library Cornell University, Ithaca, NY, pp. 1-56.
International Search Report and Written Opinion for International Application No. PCT/US2021/062732 dated Mar. 10, 2022. 15 pages.

* cited by examiner

| Row | Search Value | Search Field | Search Weight | Hyperloglog Sketch |
|---|---|---|---|---|
| 1 | Phoenix | flight_origin | 210300 | QEBACu2aoMMOQQM... |
| 2 | Albuquerque | flight_origin | 142800 | CHAQiCiYAiA9ggf4NhC... |
| 3 | Denver | flight_destination | 197500 | CHAQ9fQHCAIgCllHlaW... |
| 4 | Seattle | flight_origin | 324100 | eeOABOIDACQtwwMBB... |
| 5 | Sacramento | flight_destination | 178000 | COSCqATjQBOAT0IgSOa... |
| 6 | Louisville | flight_destination | 183800 | T5MQGfAt0wnAxvSEFAC... |
| 7 | Omaha | flight_origin | 96200 | QEBC0iiaREToDFEgq4M... |
| 8 | Phoenix | flight_destination | 133500 | AHQGCiaRllgBOAtfT5AE... |
| 9 | Delta | flight_carrier | 2988300 | jLQQP1AskpMQC3TuarY... |
| ... | ... | ... | ... | ... |

FIG. 3

| | Term Search Field | Term2 Search Value | | | Subtotals |
|---|---|---|---|---|---|
| | | | Row Limit 500 | Sort Overlap ∨ | |
| 1 | destination.full_name | SACRAMENTO INTERNATIONAL | | | 263,226 |
| 2 | destination.state | CA | | | 263,226 |
| 3 | destination.city | SACRAMENTO | | | 263,226 |
| 4 | flights.destination | SMF | | | 263,226 |
| 5 | flights.timeliness | Ontime | | | 226,736 |
| 6 | aircraft_models.manufacturer | BOEING | | | 193,981 |
| 7 | carriers.name | Southwest Airlines | | | 140,705 |
| 8 | carriers.nickname | Southwest | | | 140,705 |
| 9 | flights.carrier | WN | | | 140,705 |
| 10 | origin.state | CA | | | 120,759 |
| 11 | aircraft_models.model | 737-3H4 | | | 63,669 |
| 12 | aircraft_models.model | 757-7H4 | | | 40,704 |
| 13 | carriers.nickname | United | | | 27,295 |
| 14 | flights.carrier | UA | | | 27,295 |

FINDING DIMENSIONAL CORRELATION USING HYPERLOGLOG

BACKGROUND

Searches based on search terms typically return numerous results, and it is necessary to organize the results based on their respective relevance. Relevance of each result may be approximated in many ways.

For instance, a term may have different meanings or contexts, which may be organized according to a weighted search index that labels various terms with search fields. Each labeled term may be a separate entry in the weighted search index and may further be associated with a search weight indicating the number of distinct elements that include the labeled term. Terms associated with higher search weights may be prioritized in the search results.

The weighted search index allows for terms to be classified according to respective meanings, and for results to be prioritized according to those meanings to return more relevant meanings over less relevant ones. The weighted search index also allows for more relevant search fields to be identified and prioritized based on the search terms being associated with those search fields. This makes global searches across several search fields more efficient.

The weighted search index is limited. The relevance of search results are approximated using only the terms included in the search, and correlations between search terms and their respective fields. However, correlations between two search terms cannot be deduced from the weighted search index, and storing records of which search results include which search terms is incredibly inefficient, especially for frequent or common terms, with respect to memory consumption, which is especially impractical for large data sets.

BRIEF SUMMARY

The present disclosure provides a method for determining overlap between search terms in distinct elements in data collected from a number of sources. The method involves receiving a first search term, accessing a first hyperloglog sketch of the first search term and a second hyperloglog sketch of a second search term, and determining a degree of overlap between the first search term and the second search term based on the first hyperloglog sketch of the first search term and a second hyperloglog sketch of a second search term. Respective hyperloglog sketches of additional search terms can be accessed, and respective degrees of overlap between the first search term and the additional search terms can be determined. Respective correlation values can be assigned based on the respective degrees of overlap. Search results can be organized according to the respective correlation values in order to prioritize search terms having higher correlation values One aspect of the present disclosure is directed to a method including: receiving, by one or more processors, a first search term; accessing, by the one or more processors, a first hyperloglog sketch of the first search term and a second hyperloglog sketch of a second search term; and determining, by the one or more processors, a degree of overlap between the first search term and the second search term based on the first hyperloglog sketch of the first search term and a second hyperloglog sketch of a second search term.

In some examples, the degree of overlap between the first search term and the second search term may be based on a first count of distinct elements indexed under the first search term based on the first hyperloglog sketch and a second count of distinct elements indexed under the second search term based on the second hyperloglog sketch.

In some examples, determining the degree of overlap between the first search term and the second search term may include merging, by the one or more processors, the first and second hyperloglog sketches, and determining, by the one or more processors, a third count of distinct elements indexed under the first and second search terms based on the merged first and second hyperloglog sketches, wherein the degree of overlap between the first search term and the second search term is based further on the third count of distinct elements.

In some examples, the first hyperloglog sketch may include a first plurality of buckets including respective estimates of a total number of distinct elements indexed under the first search term, the second hyperloglog sketch may include a second plurality of buckets including respective estimates of a total number of distinct elements indexed under the second search term, and merging the first and second hyperloglog sketches may include merging each bucket of the first hyperloglog sketch with a corresponding bucket of the second hyperloglog sketch.

In some examples, determining the degree of overlap between the first search term and the second search term may include calculating, by the one or more processors, a difference between (i) a sum of the first and second counts and (ii) the third count. The calculated difference may be indicative of the degree of overlap between the first and second search terms.

In some examples, the method may further include assigning, by the one or more processors, a correlation value to the second search term based on the degree of overlap between the first and second search terms.

In some examples, the method may further include: accessing, by the one or more processors, respective hyperloglog sketches of one or more additional search terms; determining a respective degree of overlap between the first search term and each of the additional search terms based on the first hyperloglog sketch of the first search term and respective hyperloglog sketches of the one or more additional search terms; and for each additional search term, assigning, by the one or more processors, a respective correlation value based on the respective degree of overlap.

In some examples, the first search term may be received from a user search input, and the method may further include outputting, by the one or more processors, search results of the user search, wherein the search results are organized according to the respective correlation values to prioritize search terms having higher correlation values.

In some examples, each of the first and second search terms may include a respective value and a respective field indicative of a category of the respective value.

Another aspect of the disclosure is directed to a system including memory storing instructions and one or more processors coupled to the memory and configured to execute the stored instructions to receive a first search term, access a first hyperloglog sketch of the first search term and a second hyperloglog sketch of a second search term, and determine a degree of overlap between the first search term and the second search term based on the first hyperloglog sketch of the first search term and a second hyperloglog sketch of a second search term.

In some examples, the one or more processors may be configured to execute the stored instructions to determine the degree of overlap between the first search term and the second search term based on a first count of distinct elements indexed under the first search term based on the first hyperloglog sketch and a second count of distinct elements indexed under the second search term based on the second hyperloglog sketch.

In some examples, determining the degree of overlap between the first search term and the second search term may include: merging, by the one or more processors, the first and second hyperloglog sketches; determining, by the one or more processors, a third count of distinct elements indexed under the first and second search terms based on the merged first and second hyperloglog sketches, wherein the degree of overlap between the first search term and the second search term is based further on the third count of distinct elements.

in some examples, the first hyperloglog sketch may include a first plurality of buckets including respective estimates of a total number of distinct elements indexed under the first search term, the second hyperloglog sketch may include a second plurality of buckets including respective estimates of a total number of distinct elements indexed under the second search term, and merging the first and second hyperloglog sketches may include merging each bucket of the first hyperloglog sketch with a corresponding bucket of the second hyperloglog sketch.

In some examples, determining the degree of overlap between the first search term and the second search term may include calculating, by the one or more processors, a difference between (i) a sum of the first and second counts and (ii) the third count. The calculated difference may be indicative of the degree of overlap between the first and second search terms.

In some examples, the one or more processors may be configured to execute the stored instructions to assign a correlation value to the second search term based on the degree of overlap between the first and second search terms.

In some examples, the one or more processors may be configured to execute the stored instructions to access respective hyperloglog sketches of one or more additional search terms, determine a respective degree of overlap between the first search term and each of the additional search terms based on the first hyperloglog sketch of the first search term and respective hyperloglog sketches of the one or more additional search terms, and for each additional search term, assign a respective correlation value based on the respective degree of overlap.

In some examples, the first search term may be received from a user search input, and the one or more processors may be configured to execute the stored instructions to output search results of the user search. The search results may be organized according to the respective correlation values to prioritize search terms having higher correlation values.

In some examples, each of the first and second search terms may include a respective value and a respective field indicative of a category of the respective value.

Yet another aspect of the disclosure is directed to a method including: receiving, by one or more processors, information indicative of data elements included in a plurality of tables stored remotely from the one or more processors; creating, by the one or more processors, a search index from the received information, wherein the search index includes a plurality of terms derived from the received information; determining, by the one or more processors, for each term, a count of distinct elements including the term according to a hyperloglog algorithm; and storing, by the one or more processors, for each term, the determined count of distinct elements including the term in the search index.

In some examples, each term may include a value and a search field indicative of a category of the value.

BRIEF DESCRIPTION OF THE DRAWINGS

FIG. 3 is a block diagram of an example search index according to aspects of the disclosure.

FIGS. 7 and 8 are screenshots of example results tables produced using the example routine of FIG. 6.

DETAILED DESCRIPTION

Overview

Figure 1:
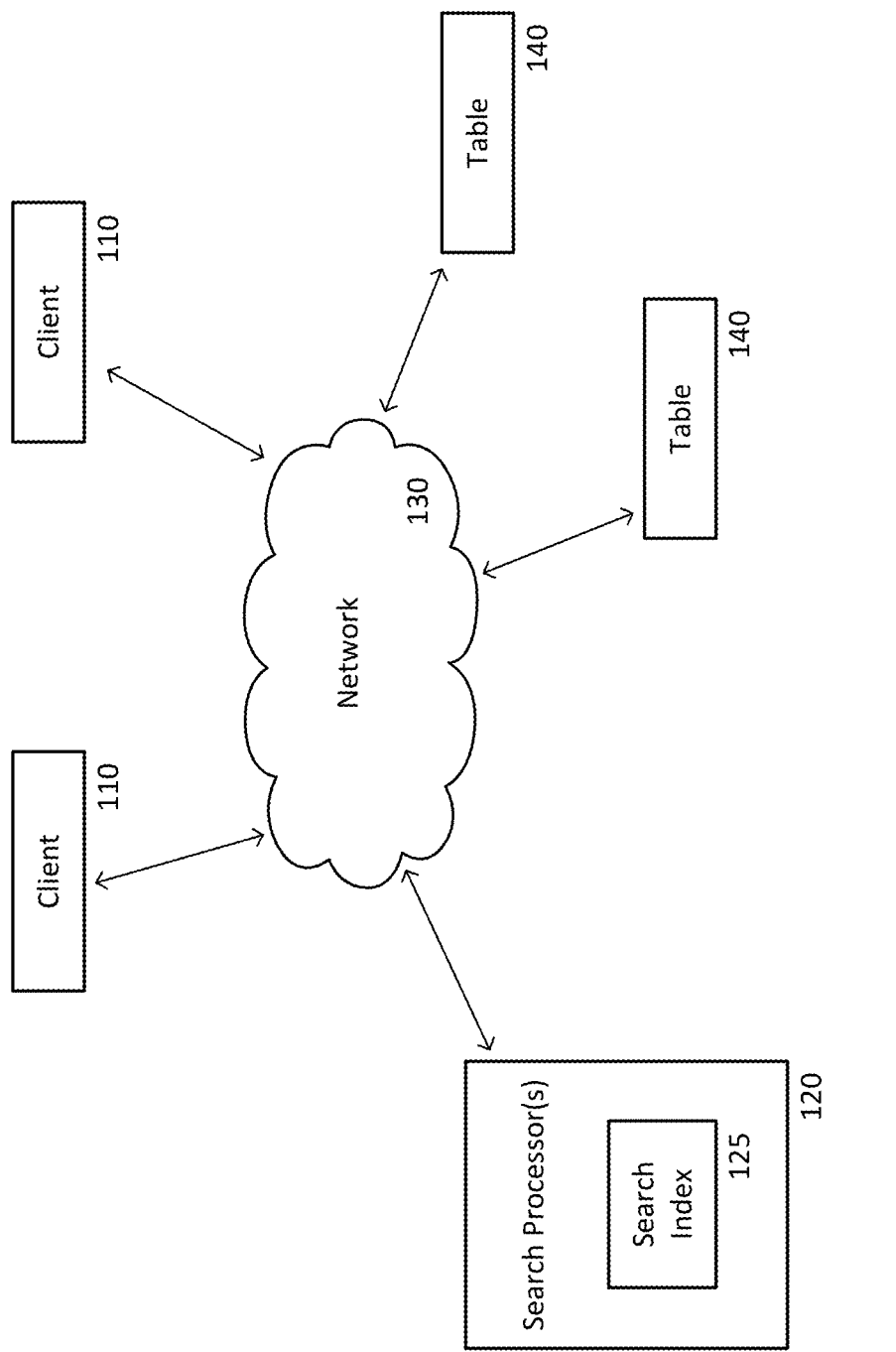
FIG. 1 is a block diagram of an example communication network according to aspects of the disclosure.

The present disclosure relates generally to a system that uses a weighted search index to determine correlations between various search terms, and a method of implementing the system to determine, for a given first search term, which other search terms are most strongly correlated to the first search term. Search results may then be organized not only according to the various search fields associated with the first search term but also the various other search terms that are strongly correlated to the first search term.

In order to derive correlation between search terms, the weighted search index replaces the search weights with hyperloglog sketches of the respective labeled terms. Hyperloglog is an algorithm that is capable of approximating the number of distinct elements in a set, and is particularly useful for large datasets in which calculating exact cardinality of the set is prohibitively expensive with respect to computational resources and time consuming. Typically, the hyperloglog algorithm separates items of the dataset into multiple buckets according to a predefined set of rules, and maintains a value for each bucket indicating an estimated number of distinct elements in the bucket. Estimates of the buckets associated with a common dataset of elements may be combined to reduce errors due to variability. The buckets for a given dataset provide a sketch of the dataset. In the case of a labeled search term, the hyperloglog sketch of the term can indicate the number of distinct elements for the term.

Furthermore, buckets of different datasets—such as different labeled terms—may be merged while still maintaining an indication of the estimated number of distinct elements in the merged buckets. Thus, merging two labeled terms can produce a hyperloglog sketch that can indicate the number of distinct elements in which one or both of the terms appear. Correlation or overlap between two labeled terms can then be derived by comparing their respective individual hyperloglog sketches with the combined hyperloglog sketch.

To illustrate, consider an example weighted search index including data regarding available flights collected from various tables and indexed according to relevant fields such as "flight origin," "flight destination," "carrier" and so on. Each flight may be a distinct element. A first labeled term may be "Phoenix (flight origin)" and a hyperloglog sketch of this first term may return a search weight of 210,300, indicating that approximately 210,300 distinct flights depart from Phoenix within a specified time frame. A second labeled term may be "Albuquerque (flight origin)," and a hyperloglog sketch of this second term may return a search weight of 142,800, indicating that approximately 142,800 distinct flights depart from Albuquerque within the same specified time frame. A third labeled term may be "Denver (flight destination)," and a hyperloglog sketch of this third term may return a search weight of 197,500, indicating that approximately 197,500 distinct flights arrive in Denver within the same specified time frame.

Combining the hyperloglog sketch of the first search term with the hyperloglog sketch of the second search term is expected to return a search weight of approximately 353,100, the sum of the search weights of the first and second terms. This is because no flight can have the same origin, so the distinct elements of the first search term are not expected to overlap at all with the distinct elements of the second search term. By comparison, combining the hyperloglog sketch of the first search term with the hyperloglog sketch of the third search term is expected to return a search weight that is less than 407,800, that is, less than the sum of the search weights of the first and third terms. This is because the distinct elements of the first search term are expected to overlap with the distinct elements of the third search term, since at least some flights that departed out of Phoenix are the same flights that arrived in Denver.

Additionally, the overlap between any two search terms may be derived using the difference between the search weight of the combined sketch of the two terms and the sum of the respective search weights of the individual terms. Continuing with the example of flights departing out of Phoenix and arriving in Denver, the total number of flights may be approximated according to the difference between the 407,800 sum of the individual sketches (210,300 distinct flights that depart from Phoenix plus 197,500 distinct flights arrive in Denver) and the search weight returned by the combined sketch. If the search weight of the combined sketch is 400,000, meaning that 400,000 include one or both of "Phoenix (flight origin)" and "Denver (flight destination)," this would indicate that approximately 202,500 depart from Phoenix but do not arrive in Denver, approximately 189,700 flight arrive in Denver but do not depart from Phoenix, and approximately 7,800 flights both depart out of Phoenix and arrive in Denver, within the given timeframe. In a similar vein, if the returned search weight is 380,000, this would indicate that approximately 27,800 flights both depart out of Phoenix and arrive in Denver within the given timeframe. If there were no flights that depart out of Phoenix and arrive in Denver within the given timeframe, then the search weight of the combined sketch would be approximately 407,800.

These computations can be used to infer a degree of overlap between different search terms, even across many search fields. The more overlap between two search terms, the higher the correlation between the terms. This, in turn, may be used to perform second level searching on a search term, whereby a first search term included in a search input is analyzed for overlap with many other search terms not included in the search input, and results including the terms that overlap the most with the first term are prioritized in the search results.

For instance, and continuing with the above example, if combining the hyperloglog sketches of the first and third terms returns a search weight of 400,000, and combining the hyperloglog sketches of the second and third terms returns a search weight of 313,900, this would indicate that approximately 7,800 Denver-bound flights depart from Phoenix, and 26,400 Denver-bound flights depart from Albuquerque, within the same given timeframe. Thus, flights arriving in Denver are more likely to depart from Albuquerque than from Phoenix by a factor of over 3. This means that the system may determine "Albuquerque (flight origin)" to be more strongly correlated to "Denver (flight destination)" than "Phoenix (flight origin)," and that flights departing out of Albuquerque may be prioritized over flights departing out of Phoenix for a search on flights arriving in Denver.

Storage requirements for the hyperloglog data are fixed, even as the amount of data being searched increases. This is in particular useful for resource planning with respect to, for instance, memory consumption. Furthermore, processing the hyperloglog data for a given indexed term can be performed on an order of $\Theta(1)$ time, and inferring correlations between the different search terms in the weight search index can be performed on an order of $\Theta(n)$ time, whereby "n" is the number of indexed terms, even as the amount of data represented by the search index increases. Thus, the hyperloglog-based weighted search index provides significant processing and storage advantages to alternative second-level searching solutions.

Example Systems

FIG. 1 illustrates an example communication network 100 including one or more nodes. The nodes may represent various computing devices connected to one another via a network connection. In the example of FIG. 1, a client nodes 110 and a search processor node 120 are shown as being connected via a network connection 130. Additional table nodes 140 storing data throughout the communication network 100 are also shown. Each of the nodes 110, 120, 140 may include a respective processor, memory, and communication device for receiving inputs and transmitting outputs.

The node processors can be a well-known processor or other lesser-known types of processors. Alternatively, the processors can be a dedicated controller such as an ASIC.

The memories can store information accessible by the processors including data that can be retrieved, manipulated or stored by the processor, instructions that can be executed by the processor, or a combination thereof. Memory may be a type of non-transitory computer readable medium capable of storing information accessible by a processor such as a hard-drive, solid state drive, tape drive, optical storage, memory card, ROM, RAM, DVD, CD-ROM, write-capable, and read-only memories.

Although FIG. 1 functionally illustrates each node as being a single block, the processors and memory associated with a given node, such as a given client or a given search processor, may actually include multiple processors and memories that may or may not be stored in a common location or within the same physical housing. For example, some or all of the data and instructions can be stored on a removable CD-ROM and others within a read-only computer chip. For further example, some or all of the data and instructions can be stored in a location physically remote from, yet still accessible by, the processor. Similarly, the processor can actually include a collection of processors, which may or may not operate in parallel.

The communication device for each node of the communication network may facilitate communication between the node and other remote devices that are in communication with the node. The remote devices may include other nodes of the communication network 100. The communication device may be capable of transmitting data to and from other computers such as modems (e.g., dial-up, cable or fiber optic) and wireless interfaces. For example, each node may receive communications via the network connection 130, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

In operation, a client node 110 may transmit a query to the search processor 120. The query may include one or more search terms to characterize the query from the client node 110. The search processor 120 may include a search index 125 that combines tables from other nodes 120 of the communication network 100 to provide information about potential search terms that may be found in the query. Using the collected information in the search index 125, the search processor may transmit back to the client search results that are relevant to the received query.

In some examples, the search processor 120 may be configured as a business intelligence (BI) tool, which may collect data from throughout the communication network, and may organize and structure the data within the search index in order to provide insights into potential search terms, which in turn may permit for more appropriate results to be returned in response to a query.

An example search index is described in greater detail herein in connection with FIG. 3.

Figure 2:
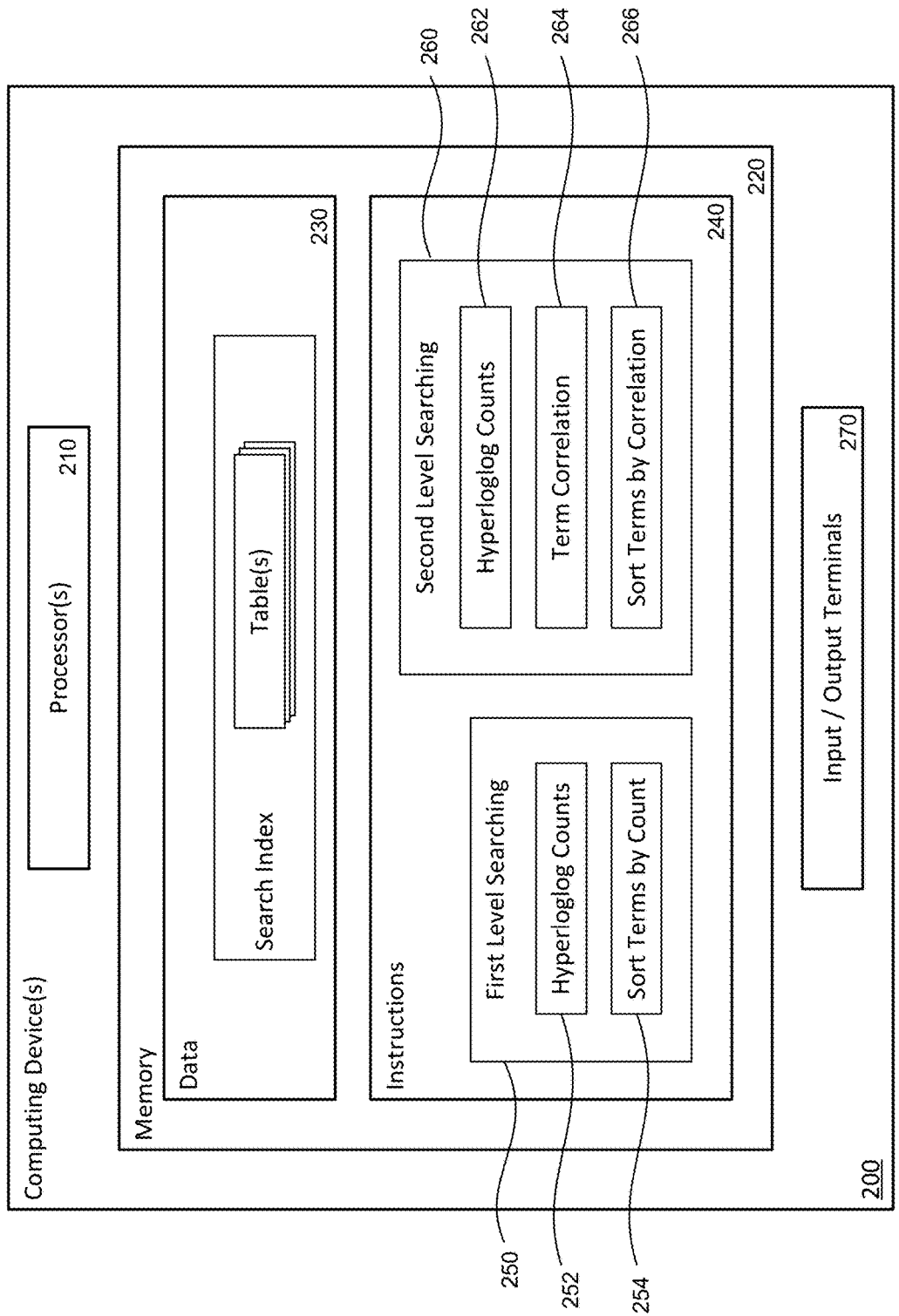
FIG. 2 is a block diagram of an example system according to aspects of the disclosure.

FIG. 2 is a block diagram of an example query processing system 200. The system 200 of FIG. 2 may be included in a search processor node of a communication network, such as node 120 of FIG. 1, and may be configured to return search results in response to queries received from client nodes, such as nodes 110 of FIG. 1.

The query processing system 200 may be one or more computing devices including one or more processors 210, memory 220, and input/output components 270 for receiving and transmitting data with other components including client nodes and tables stored at remote nodes.

The memory 220 of the first stage may include instructions 240, and may further include data 230 that can be retrieved, stored or modified by the processors 210 in accordance with the instructions 240. For instance, although the system and method is not limited by a particular data structure, the data 230 can be stored in computer registers, in a data store as a structure having a plurality of different fields and records, or documents, or buffers. The data 230 can also be formatted in a computer-readable format such as, but not limited to, binary values, ASCII or Unicode. Moreover, the data 230 can include information sufficient to identify relevant information, such as numbers, descriptive text, proprietary codes, pointers, references to data stored in other memories, including other network locations, or information that is used by a function to calculate relevant data.

The instructions 240 can be a set of instructions executed directly, such as machine code, or indirectly, such as scripts, by the processor 210. In this regard, the terms "instructions," "steps" and "programs" can be used interchangeably herein. The instructions 240 can be stored in object code format for direct processing by the processor 210, or other types of computer language including scripts or collections of independent source code modules that are interpreted on demand or compiled in advance.

The data 230 stored in the memory 220 may include a search index 232 combining data from one or more sources throughout the communication network. The data may be received as one or more tables 234, and the search index may itself be stored in the format of a table.

FIG. 3 shows an example of a search index table 300. In the example of table 300, the collected data relates to flight information. The flight information may be collected from various tables stored throughout the communication network. For instance, each of the various tables may include a respective list of flights, and information about each flight, such as the origin, the destination, and the carrier of each flight may be specified. Each flight may further be associated with a unique key or other form of identification that differentiates the flight from other flights. The search index may be constructed based all of the flight information included in these remotely stored tables, but without actually including all of the flight information from the remotely stored tables.

A first column ("Search Value") 310 includes the search terms stored in the search index. Continuing with the example of FIG. 3, the search terms are the pieces of information collected from the remote tables, including the various flight origins, flight destinations, and flight carriers. In the example of search index table 300, these search terms or search values include "Phoenix," "Albuquerque," "Denver" and so on. The search terms in FIG. 3 are values characterized by alphanumeric strings, although any other type of value and any other format may be used instead.

A second column ("Search Field") 320 identifies the respective categories or fields of the search terms included in the first column 310. Continuing with the example of FIG. 3, some of the populated values, such as "Phoenix" in row 1, are flight origins, and these values are characterized by the search field "flight_origin" in the corresponding second column 320. Other values in the first column 310, such as "Denver" in row 3, are flight destinations, and these values are characterized by the search field "flight_destination" in the corresponding second column 320. Other values in the first column 310, such as "Delta" in row 9, are flight carriers, and these values are characterized by the search field "flight_carrier" in the corresponding second column 320. Flight origin, flight destination and flight carrier are just some examples of possible categories or search fields, and it should be understood that in other examples these categories may be supplemented or replaced with other categories relevant to flight information.

It should further be recognized that the first column 310 does not sort search terms according to only their values, since the same search term may appear in more than one row of the first column 310. For instance, the value "Phoenix" appears in both row 1 and row 8. This is because the search terms are classified by their respective categories, so that "Phoenix" the flight origin is listed separately in the search index from "Phoenix" the flight destination. Thus, it can be seen that the search terms in the search index are categorized terms organized by a combination of value and search field.

The third column ("Search Weight") 330 provides an indication of how likely a query is referring to the associated search term, as opposed to a different search term. This indication may be based at least in part on the number of unique entries included in the remotely stored tables of the communication network. This may be determined based on the unique keys of the flights that include the categorized term. Use of the unique keys, as opposed to counting the number of entries received at the node of the search index, ensures that a given flight is not double counted in the search index, even if duplicates of that flight are stored across multiple remotely stored tables of the remote nodes.

The fourth column ("Hyperloglog Sketch") 340 may include a hyperloglog sketch of the categorized search term. The hyperloglog sketch includes a predetermined number of registers or buckets, each a predetermined number of bits in size. Typically, hyperloglog sketch creation for a given categorized search term involves sorting the unique keys of the flights including the categorized search term among the buckets according to a predetermined sorting rule, such as according to the first n bits in each key, and then for each bucket identifying a maximum value among the subgroup of sorted keys according to a predetermined sketching rule, such as tracking a maximum number of 0s or 1s to appear at the end of any key of the subgroup. The specific rules chosen for sorting the unique keys and identifying a maximum value are not limited to the above example techniques, as other techniques such as sorting according to the last n bits or tracking a maximum number of bits to match a predetermined sequence, may be used. The benefit of the hyperloglog sketch is that it provides a good approximation of the number of unique keys associated with the given categorized search term without any inherent error due to receiving duplicate entries of the same piece of data from different remote sources.

In some examples, the number of unique entries shown in the third column 330 may be derived by processing the corresponding hyperloglog sketch of the fourth column 340.

Returning to FIG. 2, the instructions 240 may include various algorithms for instructing the processor 210 to create the search index from the remotely stored tables and to process queries from clients and return search results. For example, the instructions 240 may include a first level searching routine 250 for identifying categorized search terms most relevant to a client's query, and a second level searching routine 260 for identifying other categorized search terms that are most highly correlated to the search terms identified in the first level searching routine 250. Although not shown in FIG. 2, the same principles may be iteratively applied to perform even deeper searching routines, such as based on the search terms identified in the second level searching routine 260.

First level searching 250 may involve a hyperloglog counting routine 252 that determines the hyperloglog count for each search term included in the search index that matches a term of the query, and a sorting routine 254 that sorts the search terms according to their respective hyperloglog counts. In this sense, search terms of the query may be interpreted to refer to the most common categorized search term having the same search value, so that results returned in response to the query are more likely to be relevant. Continuing with the example of FIG. 3, if a received query includes the term "Phoenix," it may be unclear whether the client intended to search for flights originating from Phoenix or arriving at Phoenix. First level searching can use hyperloglog processing and counting to determine the respective search weights of the search values "Phoenix" the flight origin and "Phoenix" the flight destination. Since "Phoenix" the flight origin has a much higher search weight than "Phoenix" the flight destination, search results including "Phoenix" the flight origin may be prioritized over search results including "Phoenix" the flight destination.

Second level searching 260 may involve a counting routine 262 that determines the hyperloglog count for candidate search terms included in the search index that may possibly be correlated to a first level search term identified in the first level searching routine 250, a term correlation determining routine 264 that determines, for each candidate search term, a level of correlation between the first level searching term and the candidate search term, and a sorting routine 266 that sorts the candidate search terms according to their respective levels of correlation to the first level search term. In this sense, the search processor can return results that include search terms that are likely relevant to the processed query, even if those terms do not themselves are not in the query. Stated another way, terms may be determined to be relevant based on their strong correlation to other terms included in the query, and the search results can be organized according based on those correlations derived from the second level searching. Continuing with the example of FIG. 3, if a received query includes the term "Phoenix" and many of the flights that arrive at and depart from Phoenix are serviced by Delta, then there may be a strong correlation in the data between "Phoenix" and "Delta." the second level searching may derive this correlation and prioritize search results including "Delta" information in response to the query.

Example Methods

The second level searching routine, as well as other routines and subroutines, are described in greater detail in connection with the diagrams of FIGS. 4-6. It should be understood that the routines described herein are merely examples, and in other examples, certain steps may be added, subtracted, replaced or reordered.

Figure 4:
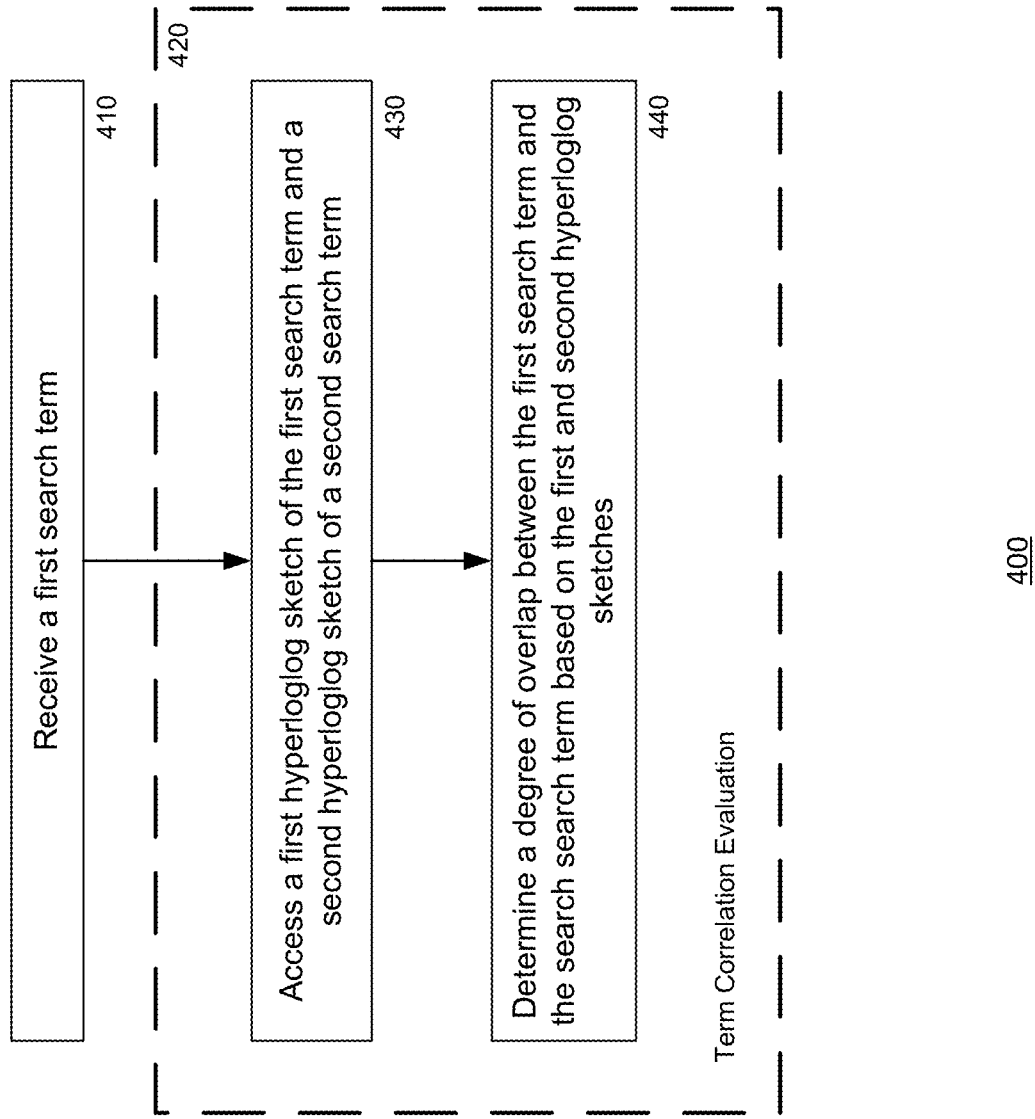
FIGS. 4 and 5 are flow diagrams of an example correlation determination routine, according to aspects of the disclosure.
Figure 5:
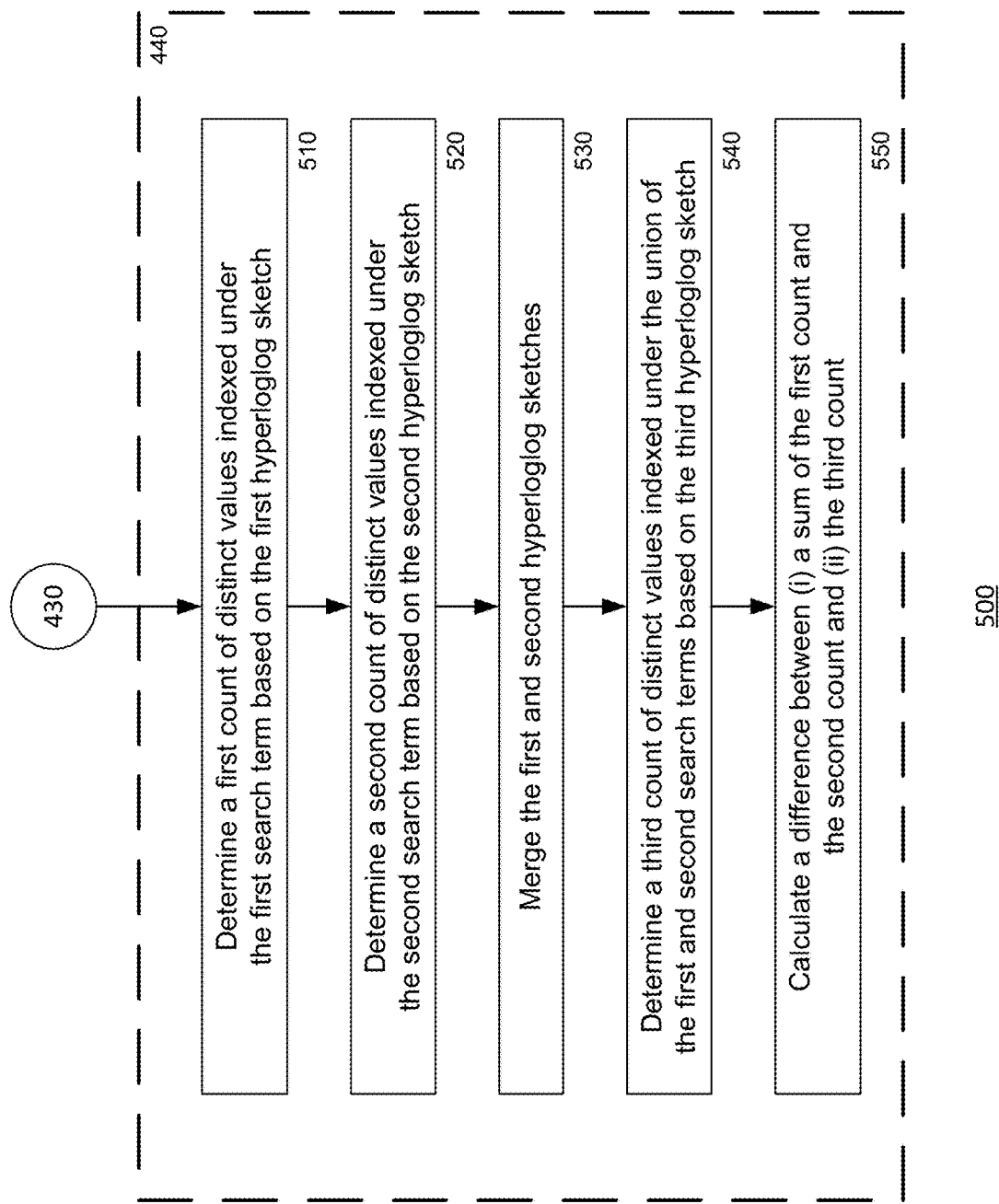

FIGS. 4 and 5 are flow diagrams illustrating an example routine 400 and subroutine 500 for determining a level of correlation between two search terms, such as a first search term included in a received query and a second search term included in the search index of the search processor. An example illustrating the routine and subroutine will be described with reference to the data shown in the example search index of FIG. 3.

At block 410, the one or more processors of the search processor receive the first search term. The first search term may be included in a query received from a client node. The first search term may be a search value, a search field, or a combination thereof. For instance, the first search term may have a search value of "Denver" with a search field of "flight_destination."

At block 420, the one or more processors evaluate a level of correlation between the first search term and the second search term. For instance, the second search term may have the search value "Phoenix" and the search field "flight_origin." In such an example, the level of correlation may indicate what number of flights departing Phoenix arrive at Denver.

At block 430, the one or more processors access a first hyperloglog sketch of the first search term and a second hyperloglog sketch of the second search term. Each hyperloglog sketch may be indicative of a total number of unique appearances of the first and second search terms, respectively, within the remotely stored data collected by the search processors in creating the search index. At block 440, the one or more processors determine a degree of overlap between the first search term and the second search term based on the first and second hyperloglog sketches. One example of this determination is shown in greater detail in the subroutine 500 of FIG. 5.

At block 510 of FIG. 5, the one or more processors determine a first count of distinct elements indexed under the first search term based on the first hyperloglog sketch. At block 520, the one or more processors determine a second count of distinct elements indexed under the second search term based on the second hyperloglog sketch. By nature of hyperloglog, the first and second counts are approximations of the total number of distinct hits for each of the first search term and the second search term. These approximations are based on the limited data stored in the buckets of the respective hyperloglog sketches, and it is not necessary for the search processor to retrieve additional data from the remotely stored tables in order to derive the first and second counts. Continuing with the example of correlating rows 1 and 3 of the search index in FIG. 3, the distinct counts of the search terms "Phoenix" (flight_origin) and "Denver" (flight_destination) are 210,300 and 197,500, respectively.

At block 530, the one or more processors merge the first and second hyperloglog sketches. This may be accomplished by performing a union between the buckets of the first hyperloglog sketch and corresponding buckets of the second hyperloglog sketch. Each bucket of the first hyperloglog sketch having corresponding bucket of the second hyperloglog sketch. For instance, if data from the collected keys is sorted among the buckets based on a number of bits at the start of each key, and each bucket is associated with a specific string of bits, then the buckets associated with the same string of bits may correspond with one another. The corresponding buckets then may be merged with one another. For instance, if each bucket indicates a single value representing a maximum number, such as the maximum of 0s to end any of the keys assigned to that bucket, then merging corresponding buckets of the first and second hyperloglog sketches may involve determining the maximum between the two corresponding buckets of the first and second hyperloglog sketches. The same merge function can be carried out for each corresponding pair of buckets in the first and second hyperloglog sketches.

At block 540, the one or more processors determine a third count of distinct elements indexed under the union of the first and second search terms. The buckets resulting from the merging of the first and second hyperloglog sketches may be thought of as a third hyperloglog sketch indicating the number of distinct hits that contain both the first search term and the second search term. In this regard, the third count may be considered a merge count, since it is a count of distinct elements included in the third hyperloglog sketch formed from merging the first and second hyperloglog sketches. The third count or merge count may be determined from the third hyperloglog sketch in the same manner that the first and second counts are determined from the first and second hyperloglog sketches, respectively. Continuing with the example shown in FIG. 3, the buckets of the hyperloglog sketches are not shown, and the merge of rows 1 and 3 is also not shown. It is assumed, for the sake of continuing the example, that merging the hyperloglog sketches of rows 1 and 3 results in a hyperloglog sketch having a search weight of 400,000.

At block 550, the one or more processors calculate a difference between (i) a sum of the first count and the second count and (ii) the third count. The sum of the first and second counts may be thought of as a maximum possible number of distinct hits that include either the first search term or the second search term if there were no overlap between these two search terms. The third count may be thought of as the actual number of distinct hits that include one or both of the first search term and the second search term, as indicated by the approximation of third hyperloglog sketch determined at block 530. The difference between the maximum possible number of distinct hits and the actual number of distinct hits equals the number of overlapping hits between the first and second search terms, that is, the number of distinct hits including both the first search term and the second search term. Continuing with the example of FIG. 3, the sum of the first count 197,500 and the second count 210,300 is 407,800. The difference between 507,800 and the third count 400,000 is 7,800. This indicates that the amount of overlap between rows 1 and 3 is 7,800, meaning that 7,800 distinct entries in the remotely stored tables are for a flight departing from Phoenix and arriving in Denver.

The difference value calculated at block 504 may also be divided by the third count. This ratio may be indicative of a rate of overlap between the first and second search terms. For example, if the maximum possible number of distinct hits is equal to the actual number of distinct hits, then this is indicative of 0% overlap between the two terms. Conversely, if the actual number of distinct hits is zero, and the calculated difference at block 550 were to equal the maximum possible number of distinct hits, then it would be indicative of 100% overlap between the first and second search terms. In a similar vein, a difference value between zero and the maximum possible number of distinct hits is indicative of partial overlap between 0% and 100%, and the degree of partial overlap would be indicated by the ratio of the difference value to the third count. In the example from FIG. 3, dividing the difference value 7,800 by the third count 380,000 returns a result of 1.9%, meaning that out of the 400,000 distinct entries in the remotely stored tables that include at least one of a flight origin of "Phoenix" or a flight destination of "Denver," 1.9% of such entries are for flights that both originate out of Phoenix and land in Denver. Thus, it can be seen the vast majority of flight traffic through Phoenix and Denver does not travel between those two cities.

The example routine of FIGS. 4 and 5 demonstrates ways of determining overlap between two search terms. This routine may be expanded to be performed on all of the search terms included in a search index in order to find the search terms that are most highly correlated with the search terms of a client's query. For instance, and continuing with the example search index of FIG. 3, the correlation determining routine run for row 1 can also be run for row 2 and the other rows of the index.

Figure 6:
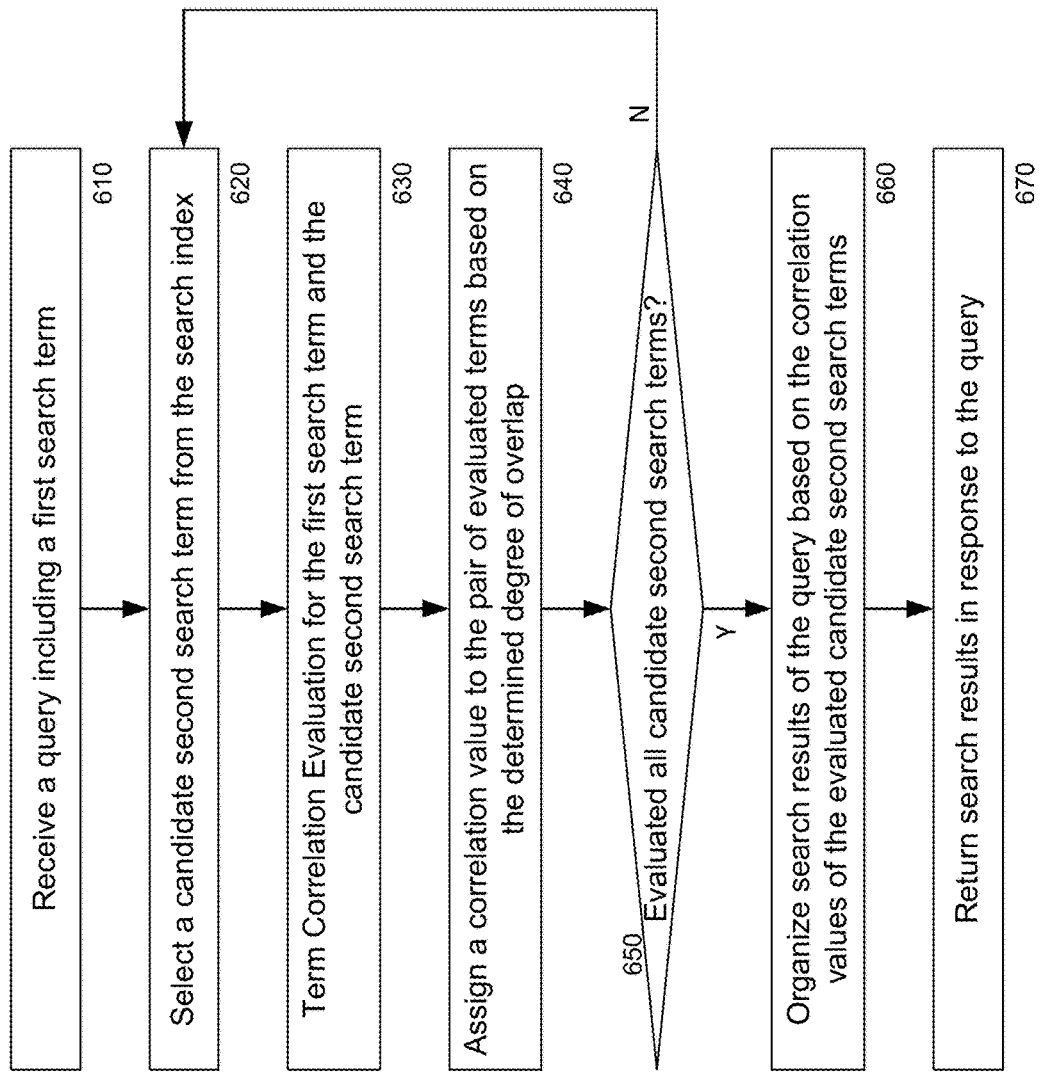
FIG. 6 is a flow diagram of an example second level searching routine, according to aspects of the disclosure.

FIG. 6 is a flow diagram illustrating an example routine 600 for conducting second level searching. The example referencing the data shown in the example search index of FIG. 3 is continued in order to illustrate the routine.

At block 610, the one or more processors receive a query including a first search term. The query may be received from a client node 110 of the communication network 130. For instance, the search term may be a term describing a real world entity a user is interested in and which has been input by the user at an input device of the client node 110. The query may include multiple search terms, and the routine 600 of FIG. 6 may be carried out on each term. For instance, and with reference to FIG. 3, if the first search term is "Denver" (flight_destination) as shown in row 3 of the search index 300, then the routine can be carried out for the terms listed at each of rows 1, 2 and 4-9 of the search index 300.

At block 620, the one or more processors select a candidate second search term from the search index. For instance, the candidate second search term may be a search term listed in a first row of the search index, such as "Albuquerque" (flight_origin) in row 2 of the search index 300 of FIG. 3.

At block 630, the one or more processors perform term correlation evaluation between the first search term and the candidate second search term. For example, the evaluation may follow the routine shown in block 410 of FIG. 4. The evaluation may determine a degree of overlap between the first and candidate second search terms, which may be, for example, a total number of distinct hits in the collected data that include both the first and candidate second search terms, or a rate of overlap of the search terms among data entries that include at least one of the search terms.

Continuing with the example of determining correlation between "Denver" (flight_destination) and "Albuquerque" (flight_origin) from FIG. 3, the first count would be 197,500, the second count would be 142,800, and the sum of these counts would be 340,300. It is assumed, for the sake of this example, that merging the first and second hyperloglog sketches results in a third count of 313,900. The difference between the sum 340,300 and the third count 313,900 is 26,400. This indicates that the amount of overlap between rows 2 and 3 in the search index of FIG. 3 is 26,400, meaning that 26,400 distinct entries in the remotely stored tables are for a flight departing from Albuquerque and arriving in Denver.

At block 640, the one or more processors may assign a correlation value to the pair of evaluated first and candidate second search terms based on the determined degree of overlap from block 650. In some examples, the correlation value may equal the determined degree of overlap. In other examples, the correlation value may be a score based at least in part on the determined degree of overlap. Other factors may affect the score-based correlation value, such as other search terms included in the query, search terms included in past queries, and so on. Continuing with the example of FIG. 3, the correlation value between "Denver" (flight_destination) and "Albuquerque" (flight_origin) may be 26,400 the same as the overlap count.

At block 650, the one or more processors may determine whether all candidate second search terms included in the search index have been evaluated with the first search term. In some examples, every search term included in the search index may be evaluated. In other examples, additional factors may be considered in limiting the entire search index to only some candidate second search terms. In the example of FIG. 3, this may involve determining correlation levels between "Denver" (flight_destination) and each of the other search terms in rows 4-9.

If it is determined at block 650 that a candidate second search term has not yet been evaluated, then operations return to block 620 and the yet-to-be-evaluated candidate second search term is evaluated. The loop between blocks 620, 630, 640 and 650 may be repeated until all candidate second search terms have been evaluated.

If it is determined at block 650 that all candidate second search terms have been evaluated, meaning that correlation values have been assigned for all candidate second search terms, then operations may proceed to block 660. At block 660, the one or more processors may organize search results of the query based on the assigned correlation values. Organizing the search results may involve prioritizing results that include second search terms having high correlation values over results that include second search terms having low correlation values.

For instance, and continuing with the example from FIG. 3, it is been determined that the number of overlapping entries between rows 1 and 3 is 7,800, but that the number of overlapping entries between rows 2 and 3 is 26,400. This may indicate a stronger level of overlap between rows 2 and 3 than between rows 2 and 3, which in turn may indicate that a query looking for information about flights arriving in Denver may be more interested search results that include flights departing from Albuquerque than results that include flights departing from Phoenix. The search results may be sorted or organized accordingly in order to provide the most relevant results towards the top of the search, or to exclude less relevant results entirely.

At block 660, the one or more processors may return search results to the querying node, such as the client node 110 of FIG. 1. The search results may be transmitted over a network connection, such as the network connection 130 shown in FIG. 1.

The example routines of FIGS. 4-6 generally refer to evaluating correlation between respective search terms. In this regard, a "search term" may be the same as a Search Value as shown in the search index of FIG. 3, meaning that the query includes a word and the search results prioritize other words that are strongly correlated to the searched word over other words that are weakly correlated to the search word. Additionally, in some examples the search term may be a categorized search term having both a Search Value and a Search Field as shown in the search index of FIG. 3. In this regard, the second level searching routine 600 of FIG. 6 may be preceded by a first level searching routine, such as the first level searching routine 250 described in connection with FIG. 2. If a search term of the query matches a Search Value included in the search index, then the first level searching routine may select or prioritize one entry in the search index having that Search Value over another entry in the search index having the same Search Value. Alternatively, if the search term of the query matches a Search Field included in the index, then the first level searching routine may select or prioritize one entry in the search index having that Search Field over another entry in the search index having the same Search Field.

For further illustration, FIGS. 7 and 8 provide example ranked evaluation results of a second level searching technique. In the example of FIG. 7, a search was conducted on NTSB flight data, and the search term provided was "destination.city:SACREMENTO," meaning that the search specifies both the search value of "Sacramento" and the search field of "Flight Destination." The results of the second level searching show other characterized terms having strong overlap with the search term "Sacramento" categorized as a destination city. Terms having 100% overlap include "SACRAMENTO INTERNATIONAL" (destination.full_name), "CA" (destination.state) and "SMF" (flights.destination), since all flights arriving at the city of Sacramento are also arrive at Sacramento International and in California. Other terms shown to have high correlation include "Ontime" (flight.timeliness) and "BOEING" (aircraft_models.manufacturer), meaning that most flights to Sacramento entered in the remotely stored tables indicate that the airplane manufacturer is Boeing and that the flight is or was on time.

In the example of FIG. 8, a search was conducted in IMDB for "batman" with no search field provided. The results show that most entries listed in IMDB that include "batman" specify "Batman" as a character name. The results also show that entries including "Batman" typically also include a "TV Episode" kind of title cast roles typical of television episodes. The results also show that entries including "Batman" typically also include characters named "Bruce Wayne" and "Robin."

The results shown in FIGS. 7 and 8 can be used to prioritize search results. The information about overlap can be used to infer what other terms a querying client may be interested in, and the search results returned to the querying client may be sorted or organized to favor entries including those inferred terms.

An advantage of the first and second level searching techniques described herein is that they can provide insights into a vast amount of remotely stored data using only a finite amount of storage space, and without having to communicate with the data sources to retrieve additional information. Stated another way, the hyperloglog counts stored in the search index, despite their fixed size, are sufficient for deducing correlations between any two search terms included in the remotely stored data, regardless of the size of the remotely stored data. Therefore, processing the hyperloglog data for a given indexed term can be performed on an order of $\Theta(1)$ time, even as the amount of data indexed under the term increases. In the same regard, determining correlation or overlap between two terms can also be performed on an order of $\Theta(1)$ time, since the determination requires processing of hyperloglogs for two indexed terms without having to refer back to the sources of the data indicated by those terms. For a search index having "n" indexed terms, second level searching through inferred correlations between one search term and the other search terms can be performed on an order of $\Theta(n)$ time, and also without having to refer back to the sources of the data indicated by those terms.

Another advantage of the first and second level searching techniques described herein is that these techniques can be executed on many formats of data, including but not limited to SQL tables. There are very few constraints on the data included in the search index, only that search terms be associated with corresponding hyperloglog counts, and optionally with search fields in order to better characterize the search terms included in a query.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
receiving, by one or more processors, a first search term;
accessing, by the one or more processors, a first hyperloglog sketch of the first search term and a second hyperloglog sketch of a second search term; and
determining, by the one or more processors, a degree of overlap between the first search term and the second search term based on the first hyperloglog sketch of the first search term and a second hyperloglog sketch of a second search term,
wherein determining the degree of overlap between the first search term and the second search term includes:
merging, by the one or more processors, the first and second hyperloglog sketches; and
determining, by the one or more processors, a third count of distinct elements indexed under the first and second search terms based on the merged first and second hyperloglog sketches, wherein the degree of overlap between the first search term and the second search term is based further on the third count of distinct elements.

2. The method of claim 1, wherein the degree of overlap between the first search term and the second search term is based on a first count of distinct elements indexed under the first search term based on the first hyperloglog sketch and a second count of distinct elements indexed under the second search term based on the second hyperloglog sketch.

3. The method of claim 1, wherein the first hyperloglog sketch includes a first plurality of buckets including respective estimates of a total number of distinct elements indexed under the first search term, wherein the second hyperloglog sketch includes a second plurality of buckets including respective estimates of a total number of distinct elements indexed under the second search term, wherein merging the first and second hyperloglog sketches including merging each bucket of the first hyperloglog sketch with a corresponding bucket of the second hyperloglog sketch.

4. The method of claim 1, wherein determining the degree of overlap between the first search term and the second search term includes calculating, by the one or more processors, a difference between (i) a sum of the first and second counts and (ii) the third count, wherein the calculated difference is indicative of the degree of overlap between the first and second search terms.

5. The method of claim 1, further comprising assigning, by the one or more processors, a correlation value to the second search term based on the degree of overlap between the first and second search terms.

6. The method of claim 5, further comprising:
accessing, by the one or more processors, respective hyperloglog sketches of one or more additional search terms;
determining a respective degree of overlap between the first search term and each of the additional search terms based on the first hyperloglog sketch of the first search term and respective hyperloglog sketches of the one or more additional search terms; and
for each additional search term, assigning, by the one or more processors, a respective correlation value based on the respective degree of overlap.

7. The method of claim 6, wherein the first search term is received from a user search input, and wherein the method further comprises outputting, by the one or more processors, search results of the user search, wherein the search results are organized according to the respective correlation values to prioritize search terms having higher correlation values.

8. The method of claim 1, wherein each of the first and second search terms includes a respective value and a respective field indicative of a category of the respective value.

9. A system comprising:
memory storing instructions; and
one or more processors coupled to the memory and configured to execute the stored instructions to:
receive a first search term;

access a first hyperloglog sketch of the first search term and a second hyperloglog sketch of a second search term; and determine a degree of overlap between the first search term and the second search term based on the first hyperloglog sketch of the first search term and a second hyperloglog sketch of a second search term, wherein the one or more processors are configured to execute the stored instructions to determine the degree of overlap between the first search term and the second search term by:

merging the first and second hyperloglog sketches; and determining a third count of distinct elements indexed under the first and second search terms based on the merged first and second hyperloglog sketches, wherein the degree of overlap between the first search term and the second search term is based further on the third count of distinct elements.

10. The system of claim 9, wherein the one or more processors are configured to execute the stored instructions to determine the degree of overlap between the first search term and the second search term based on a first count of distinct elements indexed under the first search term based on the first hyperloglog sketch and a second count of distinct elements indexed under the second search term based on the second hyperloglog sketch.

11. The system of claim 9, wherein the first hyperloglog sketch includes a first plurality of buckets including respective estimates of a total number of distinct elements indexed under the first search term, wherein the second hyperloglog sketch includes a second plurality of buckets including respective estimates of a total number of distinct elements indexed under the second search term, wherein the one or more processors are configured to execute the stored instructions to merge the first and second hyperloglog sketches by merging each bucket of the first hyperloglog sketch with a corresponding bucket of the second hyperloglog sketch.

12. The system of claim 9, wherein the one or more processors are configured to execute the stored instructions to determine the degree of overlap between the first search term and the second search term by calculating a difference between (i) a sum of the first and second counts and (ii) the third count, wherein the calculated difference is indicative of the degree of overlap between the first and second search terms.

13. The system of claim 9, wherein the one or more processors are configured to execute the stored instructions to assign a correlation value to the second search term based on the degree of overlap between the first and second search terms.

14. The system of claim 13, wherein the one or more processors are configured to execute the stored instructions to:

access respective hyperloglog sketches of one or more additional search terms;

determine a respective degree of overlap between the first search term and each of the additional search terms based on the first hyperloglog sketch of the first search term and respective hyperloglog sketches of the one or more additional search terms; and for each additional search term, assign a respective correlation value based on the respective degree of overlap.

15. The system of claim 14, wherein the first search term is received from a user search input, and wherein the one or more processors are configured to execute the stored instructions to output search results of the user search, wherein the search results are organized according to the respective correlation values to prioritize search terms having higher correlation values.

16. The system of claim 9, wherein each of the first and second search terms includes a respective value and a respective field indicative of a category of the respective value.

17. A method comprising:

receiving, by one or more processors, information indicative of data elements included in a plurality of tables stored remotely from the one or more processors;

creating, by the one or more processors, a search index from the received information, wherein the search index includes a plurality of terms derived from the received information;

determining, by the one or more processors, for each term, a count of distinct elements including the term according to a hyperloglog algorithm;

generating, by the one or more processors, for each term, a hyperloglog sketch of the term according to the determined distinct count of elements, wherein the hyperloglog sketch is arranged to indicate a degree of overlap between the term and another term of the search index based on a merged count of distinct elements determined from a merge of the hyperloglog sketches of the term and the other term; and storing, by the one or more processors, for each term, the determined count of distinct elements including the term and the hyperloglog sketch of the term in the search index.

18. The method of claim 17, wherein each term includes a value and a search field indicative of a category of the value.

\* \* \* \* \*